United States Patent
Jakob et al.

(10) Patent No.: US 6,321,172 B1
(45) Date of Patent: Nov. 20, 2001

(54) METHOD FOR CONFIGURING SENSORS

(75) Inventors: Hermann Jakob, Winden; Theodor Wanner, Waldkirch, both of (DE)

(73) Assignee: Schmersal-EOT GmbH & Co. KG, Freiburg (DE)

( * ) Notice: Subject to any disclaimer, the term of this patent is extended or adjusted under 35 U.S.C. 154(b) by 0 days.

(21) Appl. No.: 09/248,486

(22) Filed: Feb. 10, 1999

(30) Foreign Application Priority Data

Feb. 12, 1998 (DE) ............................................. 198 05 606

(51) Int. Cl.[7] .................................................... G01D 18/00
(52) U.S. Cl. .............................. 702/104; 702/85; 702/104; 73/1.01
(58) Field of Search ............................... 702/104, 85, 116, 702/91; 73/1.01, 1.16; 340/506, 531, 539

(56) References Cited

U.S. PATENT DOCUMENTS

| | | |
|---|---|---|
| 4,737,770 | 4/1988 | Brunius et al. . |
| 4,772,876 | 9/1988 | Laud . |
| 5,089,979 | 2/1992 | McEachern et al. . |
| 5,335,186 | 8/1994 | Tarrant . |
| 5,408,217 | 4/1995 | Sanderford, Jr. . |
| 6,032,109 | * 2/2000 | Ritmiller, III ........................ 702/104 |

FOREIGN PATENT DOCUMENTS 41 24 191 A 1    1/1993   (DE) .

* cited by examiner

Primary Examiner—Marc S. Hoff
Assistant Examiner—Hien Vo
(74) Attorney, Agent, or Firm—Alix, Yale & Ristas, LLP

(57) ABSTRACT

The invention relates to a method for configuring sensors by transferring configuration data containing an existing configuration of a sensor from an original sensor to a sensor to be configured, comprising the steps of:

connecting the original sensor in its configured state to a module which stores the current configuration data of the original sensor and a checksum corresponding to the configuration data in the module;

connecting the module to the sensor to be configured;

reading the configuration data stored in the module into the sensor to be configured;

calculating a new checksum corresponding to the data read in;

then comparing the calculated checksum with the checksum stored in the module; and generating an error message in the event of a non-match of the two checksums.

7 Claims, 1 Drawing Sheet

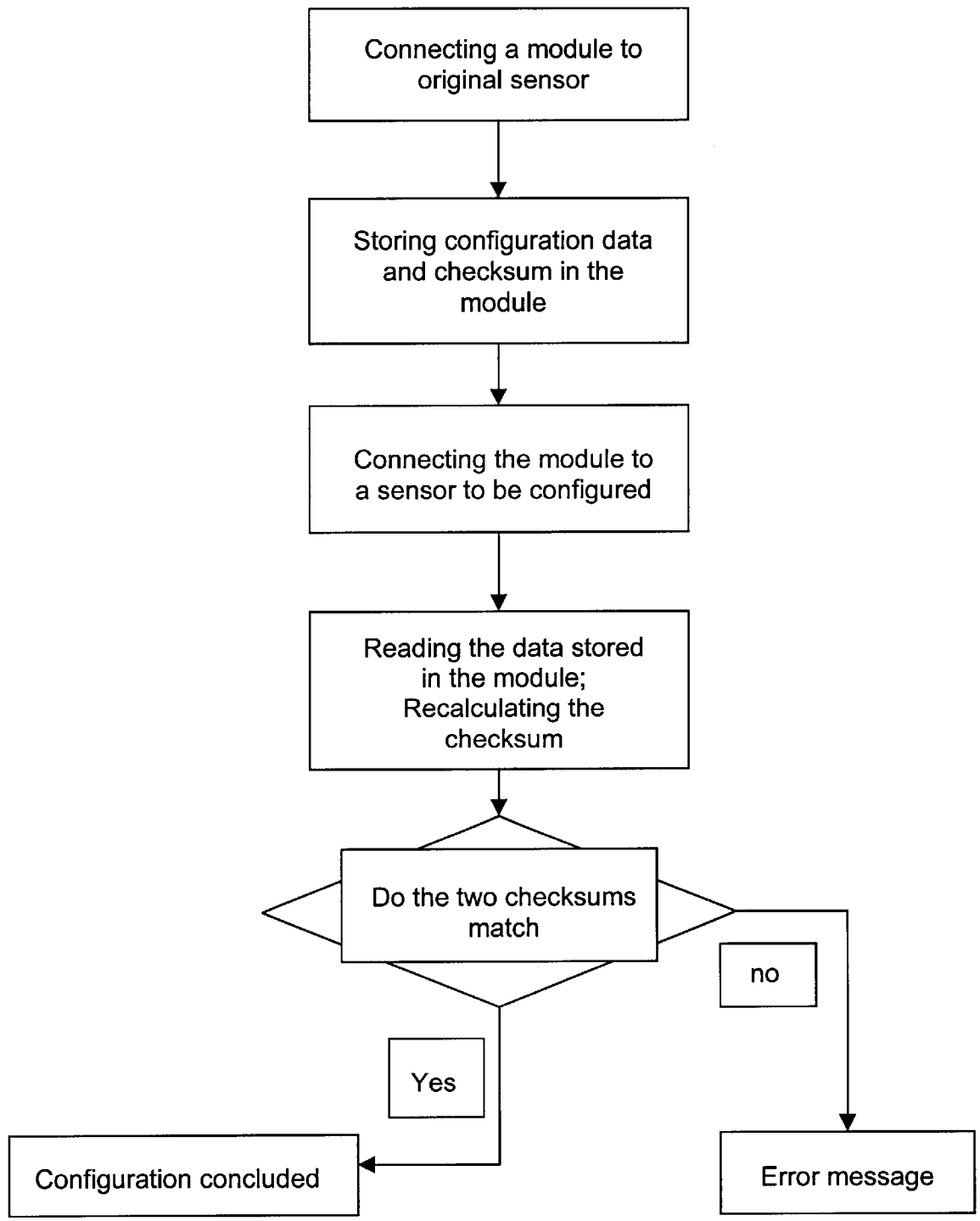

METHOD FOR CONFIGURING SENSORS

FIELD OF THE INVENTION

This invention relates to a method for configuring sensors.

Sensors are used for picking up measurands (e.g. of electromagnetic radiation) and for converting them into electrical signals. They are applied everywhere including complex systems and plants, in which frequently a multiplicity of sensors is used. The data and signals supplied by the sensors are further processed electronically. Since the peripherals connected to each sensor and the tasks set for it can vary, it is necessary to configure the sensor in relation to its respective peripherals. The sensors can be, for example, scanners.

In this connection, it may be appropriate to transfer a pre-existing configuration of a sensor to another sensor. Such a transfer of the configuration of an original sensor to a sensor to be configured will be performed, for example, if the original sensor is defective and must therefore be replaced or if its configuration is to be duplicated in order to be transferred to other sensors.

DESCRIPTION OF PRIOR ART

It is known to transfer the configuration of an original sensor to a sensor to be configured by using a personal computer. In this arrangement, configuration data which contains the configuration of the original sensor to be transferred is first stored on a data medium. The personal computer then reads these configuration data in and sends them to the sensor to be configured. However, personal computers are regarded as "unsafe" in such applications. If it is therefore intended to use the sensor to be configured in safety-critical applications, each parameter must be individually confirmed by the user in order to detect any possible falsification of the configuration data. This makes the method very time-consuming.

SUMMARY OF THE INVENTION

It is an object of the invention to provide a method for configuring sensors in which no personal computer is needed and no user confirmation of the configuration data is required.

This is achieved by a method for configuring sensors by transferring configuration data containing an existing configuration of a sensor from an original sensor to a sensor to be configured, comprising the steps of:

connecting the original sensor in its configured state to a module which stores the current configuration data of the original sensor and a checksum corresponding to the configuration data in the module;

connecting the module to the sensor to be configured;

reading the configuration data stored in the module into the sensor to be configured;

calculating a new checksum corresponding to the data read in;

then comparing the calculated checksum with the checksum stored in the module; and generating an error message in the event of a non-match of the two checksums.

In this arrangement, configuration data is transferred from an original sensor to a sensor to be configured by means of a storage module, a falsification of data being detectable via a comparison of checksums which are added to the data.

Further objects, advantages and embodiments of the invention will become apparent from the following description and the claims.

BRIEF DESCRIPTION OF THE DRAWING

The invention is explained in more detail below with reference to an exemplary embodiment of the method which is illustrated in the attached flow chart.

DETAILED DESCRIPTION OF THE PREFERRED EMBODIMENT

A storage module is first connected to an original sensor. This can be done both in the unconfigured state of the original sensor, for instance when it is taken into operation, and in the configured state, that is to say at a later time.

The sensors for which the invention has particular applicability are security sensors which detect measured values and compare them with preset values. Examples of such possible sensors are scanners, optical sensors, light curtains, sensors for determining the presence and/or the distance or location of objects as well as sensors which are capable of determining distances or monitoring access regions. The sensors may also embrace general evaluation devices which are able to process information.

The storage module can be preferably inserted or plugged into the original sensor from the outside so that it does not need to be opened for inserting the storage module. The module comprises a non-volatile memory and essentially has the form and function of a chip card or a memory card.

As long as the storage module is connected to the original sensor, all configuration data containing the current configuration of the sensor can be stored in the storage module. Such configuration data may include variable parameters, e.g., limit values for protection fields, which are compared with actual measured values; parameters for the evaluation algorithms of the protection field monitoring; settings for the behavior of the sensor after a preset definable event, such as an object inside a protection field, after a power on condition; etc. The configuration data, for example, for a scanner may include, among other data, such information as the dimensions or geometry of the observation area, the number of multiple evaluations, the response time, the minimal object size, actions which are performed in case of an intrusion of an object into the observation area, starting behavior at a power-on condition and information concerning the date of the configuration.

In this arrangement, the configuration data is supplemented within the storage module by a checksum (e.g. 16-bit CRC sum) which is used for revealing any possible falsification of the configuration data during the later reading of the configuration data from the storage module. An algorithm is applied to all the configuration data. The algorithm processes the bytes and/or words in the memory to calculate a corresponding checksum which is representative of the configuration data.

The storage module is then connected via a plug connection to a sensor to be configured. The insertion of the storage module can also be performed preferably from the outside, i.e. without opening the sensor to be configured. After that, all data stored in the storage module, i.e. the configuration data and checksum, is read into the sensor to be configured. The data stored in the storage module is preferably automatically read into the sensor to be configured after it has been switched on. During this process, the checksum corresponding to the data read in is recalculated, the calculation taking place in the same manner as in the case of the checksum stored in the storage module.

The recalculated checksum is then compared with that stored in the storage module. If there is a falsification or error of the configuration data read by the sensor to be configured, the sensor detects that the stored checksum does not match the recalculated one, whereupon an error message is generated. Since both the original checksum and the recalculated checksum represent configuration data for the sensor, the configuration data is assumed to be identical if the checksums are identical. The error message causes a deactivation of the outputs of the sensor so that a machine or device connected to the sensor cannot start.

As a result, the configuration data extended by a checksum can be certified or regarded as "safe". No confirmation by the user, for instance during the reading of the configuration data by the sensor to be configured, is therefore necessary, so that the user is not actively participating in the safety sequence.

The fields of application of the method in particular also include the configuring of sensors which operate on the basis of electromagnetic radiation. Such sensors can be used, for example, for detecting the presence or absence of an object in the area of a room to be monitored.

While the invention has been shown and described with reference to a preferred embodiment, it should be apparent to those skilled in the art that many changes and modifications may be made without departing from the scope of the invention as defined in the claims.

What is claimed is:

1. A method for configuring sensors by transferring the current configuration data containing an existing configuration of a sensor from an original sensor to a sensor to be configured, comprising the steps of:

connecting the original sensor in the existing configuration to a module which stores the current configuration data of the original sensor and a checksum corresponding to the current configuration data in the module;

connecting the module to the sensor to be configured;

reading the current configuration data stored in the module into the sensor to be configured;

calculating a new checksum corresponding to the data read in;

then comparing the calculated checksum with the checksum stored in the module; and generating an error message in the event of a non-match of the two checksums.

2. The method of claim 1, comprising providing sensors which are scanners.

3. The method of claim 1, comprising inserting the storage module into the sensors from the outside.

4. The method of claim 1, wherein the sensor to be configured automatically reads the data stored in the module after having been switched on.

5. The method of claim 1, wherein the sensor automatically compares the checksum stored therein with the calculated checksum during the reading of the data stored in the storage module.

6. The method of claim 1, wherein the sensors are used as receivers for optical radiation of devices which detect the presence or absence of an object in the area of a room to be monitored.

7. The method of claim 1, further comprising calculating the checksum corresponding to the configuration data of the original sensor.

* * * * *